(12) United States Patent
Nishihara

(10) Patent No.: US 12,484,782 B2
(45) Date of Patent: Dec. 2, 2025

(54) MAGNETIC RESONANCE IMAGING APPARATUS, AND CONTROL METHOD AND CONTROL PROGRAM THEREOF

(71) Applicant: FUJIFILM Corporation, Tokyo (JP)

(72) Inventor: Takashi Nishihara, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 238 days.

(21) Appl. No.: 17/241,643

(22) Filed: Apr. 27, 2021

(65) Prior Publication Data

US 2022/0054010 A1 Feb. 24, 2022

(30) Foreign Application Priority Data

Aug. 21, 2020 (JP) .................. 2020-140321

(51) Int. Cl.
*A61B 5/00* (2006.01)
*A61B 5/055* (2006.01)
*G01R 33/54* (2006.01)

(52) U.S. Cl.
CPC ............ *A61B 5/0037* (2013.01); *A61B 5/055* (2013.01); *A61B 5/7267* (2013.01); *G01R 33/543* (2013.01)

(58) Field of Classification Search
CPC ..... A61B 5/0037; A61B 5/055; A61B 5/7267; A61B 5/7264; A61B 5/742; A61B 5/7485; G01R 33/543; G01R 33/56563; G01R 33/56572
See application file for complete search history.

(56) References Cited

U.S. PATENT DOCUMENTS

| 10,365,344 | B2 | 7/2019 | Dannels et al. |
| 11,221,388 | B1* | 1/2022 | Posse ............... G01R 33/56563 |
| 2002/0055676 | A1* | 5/2002 | Van Vaals ........... G01R 33/561 |
| | | | 600/410 |

(Continued)

FOREIGN PATENT DOCUMENTS

| CN | 104379049 A | 2/2015 |
| CN | 111223563 A | 6/2020 |

(Continued)

OTHER PUBLICATIONS

Japanese Office Action received in corresponding Japanese Application No. 2020-140321 dated Dec. 12, 2024.

(Continued)

*Primary Examiner* — Pascal M Bui Pho
*Assistant Examiner* — Gabriel Victor Popescu
(74) *Attorney, Agent, or Firm* — MATTINGLY & MALUR, PC

(57) ABSTRACT

A prescan is automated to the greatest extent practicable, allowing acquisition of a favorable image irrespective of skills of an operator, as well as minimizing the time related to the prescan. For a plurality of image types in imaging tasks, a comprehensive FOV including all FOVs respectively of a plurality of image types is set, and for the comprehensive FOV, it is determined whether or not an item adjusted by the prescan satisfies an allowable condition for each image type, and the prescan is executed to make an adjustment appropriate for the image type with the strictest condition, on the item not satisfying the allowable condition.

8 Claims, 8 Drawing Sheets

(56) References Cited

U.S. PATENT DOCUMENTS

2007/0167730 A1* 7/2007 Tatebayashi ....... G01R 33/4833
  600/410
2011/0245655 A1* 10/2011 Abe ................... G01R 33/4833
  600/410
2021/0177295 A1* 6/2021 Maximo .............. A61B 5/0037

FOREIGN PATENT DOCUMENTS

| JP | 3-258244 A | 11/1991 |
| JP | 2009-148463 A | 7/2009 |
| JP | 2012-161354 A | 8/2012 |
| JP | 2013-99449 A | 5/2013 |
| JP | 2013-223576 A | 10/2013 |
| JP | 2014-236987 A | 12/2014 |
| JP | 2015-029676 A | 2/2015 |
| JP | 2016-10670 A | 1/2016 |
| JP | 2016-106976 A | 6/2016 |
| JP | 2018-202137 A | 12/2018 |
| WO | 2014/002565 A1 | 1/2014 |

OTHER PUBLICATIONS

Chinese Office Action received in corresponding Chinese Application No. 202110310562.6 dated May 8, 2024.

* cited by examiner

FIG. 6

| # | IMAGING TASK NAME |
|---|---|
| 1 | Scanogram (3plane)(BH) |
| 2 | shim |
| 3 | S-Map |
| 4 | T2 AX (BH) |
| 5 | 2D MRCP (BH) |
| 6 | 3D MRCP (RG) |
| 7 | T2 AX FS(RG) |
| 8 | T1 GRE/FatSep (BH) |
| 9 | In/out (BH) |
| 10 | DWI (RG) |

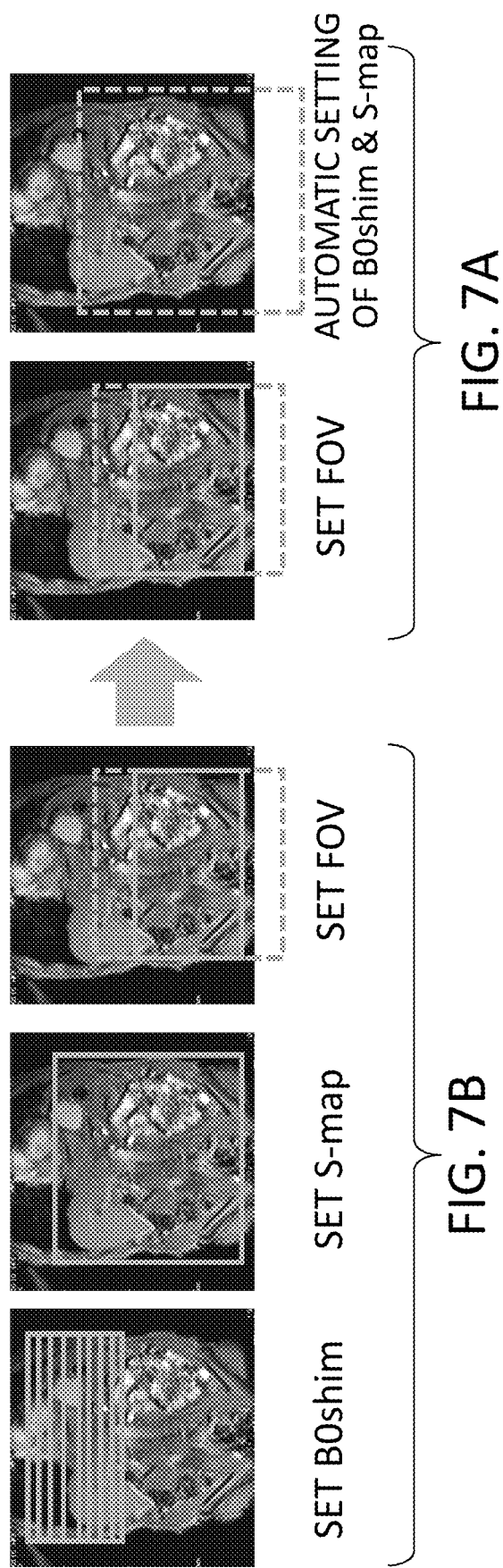

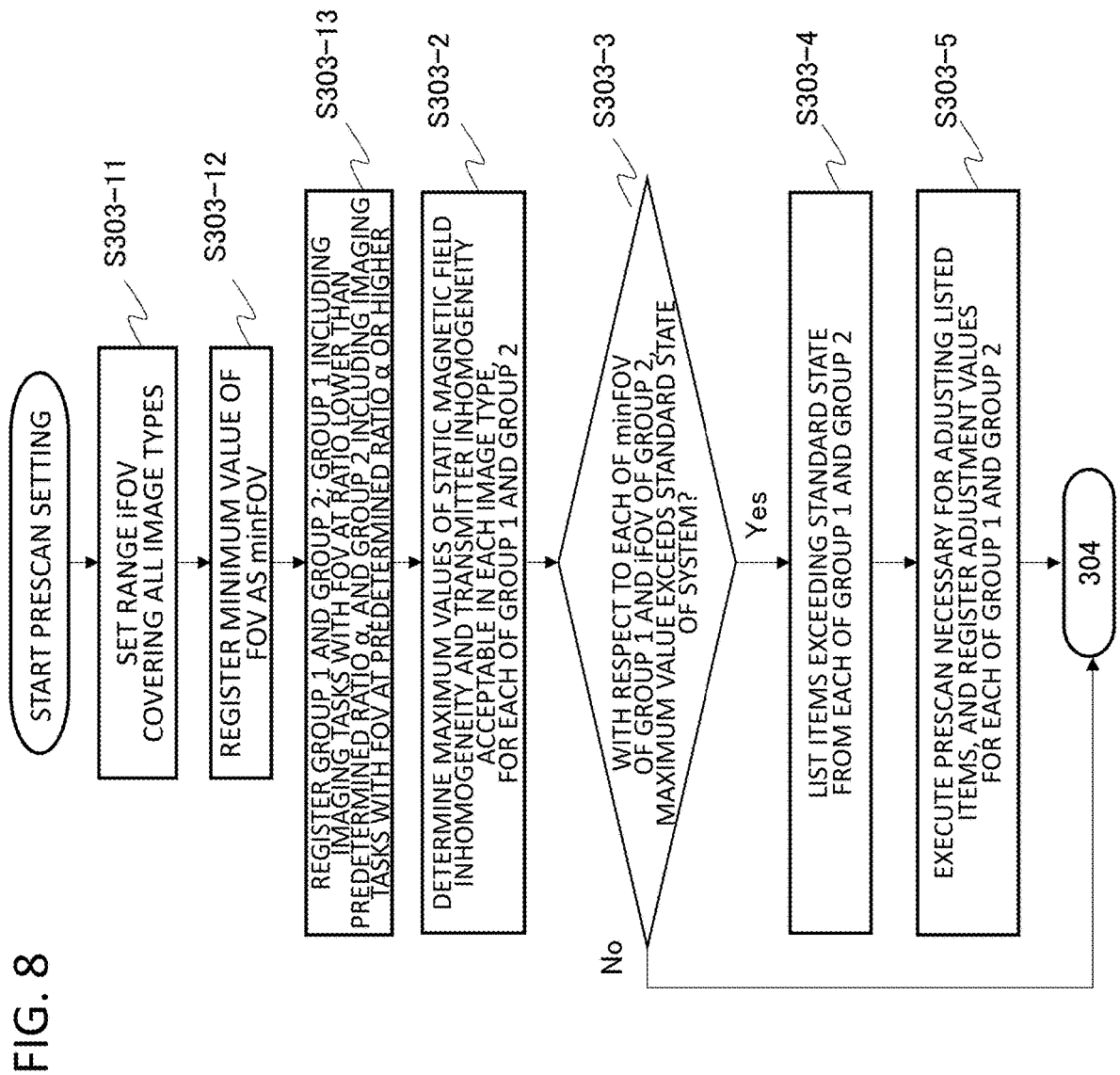

MAGNETIC RESONANCE IMAGING APPARATUS, AND CONTROL METHOD AND CONTROL PROGRAM THEREOF

INCORPORATION BY REFERENCE

The present application claims priority from Japanese patent application JP-2020-140321 filed on Aug. 21, 2020, the content of which is hereby incorporated by reference into this application.

BACKGROUND OF THE INVENTION

Field of the Invention

The present invention relates to a magnetic resonance imaging apparatus (hereinafter, referred to as an MRI apparatus). More particularly, the present invention relates to a control of a prescan that is performed for pre-adjustment in imaging performed by the MRI apparatus.

Description of the Related Art

In MRI apparatuses, it is necessary to adjust (calibrate) a setting of a system to conform to a purpose of imaging, prior to the start of imaging (main imaging) for acquiring an image of a subject. This calibration of the setting is called as a prescan. The prescan should be performed to obtain an optimum image quality for each imaging method or for each image type. Therefore, a user sets and executes the prescan in accordance with the details to be calibrated. There have been proposed various prescans depending on a purpose of adjustment (for example, in the documents including JP-A-2014-236987 and JP-A-2018-202137, hereinafter referred to as Patent Documents 1 and 2, respectively).

For example, Patent Document 1 discloses a technique to perform the prescan for obtaining a sensitivity distribution of a coil. Further in Patent Document 2, there is suggested that a distribution of RF magnetic fields according to a radio-frequency (RF) coil is acquired from nuclear magnetic resonance (NMR) signals obtained by the prescan, and then transmitter gain adjustment is performed.

Usually, imaging of the subject is performed along an examination protocol that determines in advance combinations of imaging to obtain a plurality of image types, depending on a site, a disease, or others, considered as an examination target. In the examination protocol, a sequence of imaging tasks is determined so that for example, after acquiring a scanogram for performing positioning of the examination target, followed by shimming for compensating for static magnetic field inhomogeneity and prior measurement (prescan) for acquiring sensitivity information of a receiving coil, various image types with different contrast of tissue are acquired, for example, a T2-weighted image, a T1-weighted image, a diffusion-weighted image, and so on. Since optimum conditions are different depending on the image types, in many cases, the prescan has to be performed for each image type, and this causes a problem that the examination time is extended.

A sequence and parameters of the prescan are set by an operator, and thus in some cases, the setting is not correct when the operator's skill level is not sufficiently high. In that case, a favorable image may not be obtained, causing the necessity of re-imaging, and this may result in a lowered examination efficiency. A skilled operator is required, because it is difficult to make decision on the image type, an imaging site, a position of a lesion, a source of artifacts, and so on, which are acquired in the examination.

The present invention aims at automating the prescan as greatly as possible, enabling acquisition of the favorable image, irrespective of the skills of the operator, as well as minimizing the time related to the prescan.

SUMMARY OF THE INVENTION

In order to solve the problems described above, the present invention determines, from an entire protocol registered in a system, a condition as to which adjustment is inevitable in light of a standard state provided in the system, for each imaging condition of imaging tasks included in the protocol, and automatically or semi-automatically determines whether or not a pre-measurement (prescan) is required to be executed, and execution details of the prescan.

That is, the MRI apparatus of the present invention includes an imaging unit configured to acquire a nuclear magnetic resonance (NMR) signal according to a predetermined imaging sequence, a processing unit configured to process the NMR signal acquired by the imaging unit, and a control unit configured to control operations of the imaging unit and the processing unit. The control unit includes an accepting unit configured to accept one or more types of imaging tasks, an adjustment item determiner configured to determine an adjustment item necessary for executing the imaging task accepted by the accepting unit, and a prescan condition setter configured to set a prescan condition including execution or non-execution of the prescan based on a result of the adjustment item determiner, and the control unit controls the imaging unit so as to perform the prescan and the imaging task, according to the prescan condition determined by the prescan condition setter.

A control method of the MRI apparatus of the present invention is directed to automatic or semi-automatic execution of the prescan which is adjustment prior to imaging, wherein for a plurality of image types in imaging tasks, a comprehensive FOV is set, including all FOVs respectively of the plurality of image types, and for the comprehensive FOV, it is determined whether or not an item adjusted by the prescan satisfies an allowable condition for each image type, followed by a control to execute the prescan on the item not satisfying the allowable condition, so as to make an adjustment that is appropriate for the image type with the strictest condition.

According to the present invention, by determining the adjustment item automatically or semi-automatically, it is possible to eliminate the need for redundant execution of the prescan, and the minimum number of prescans can be executed efficiently. Thus, it is possible to reduce the total examination time. Further, re-imaging due to failure of the prescan can be eliminated.

BRIEF DESCRIPTION OF THE DRAWINGS

FIG. 6 illustrates an example of an examination protocol;
FIGS. 7A and 7B illustrate a difference between the present invention and the prior art; and
FIG. 8 is a flow diagram showing a process of the imaging according to a third embodiment.

DETAILED DESCRIPTION OF THE PREFERRED EMBODIMENTS

There will now be described embodiments of an MRI apparatus of the present invention and a control method thereof, with reference to the accompanying drawings.

Figure 1:
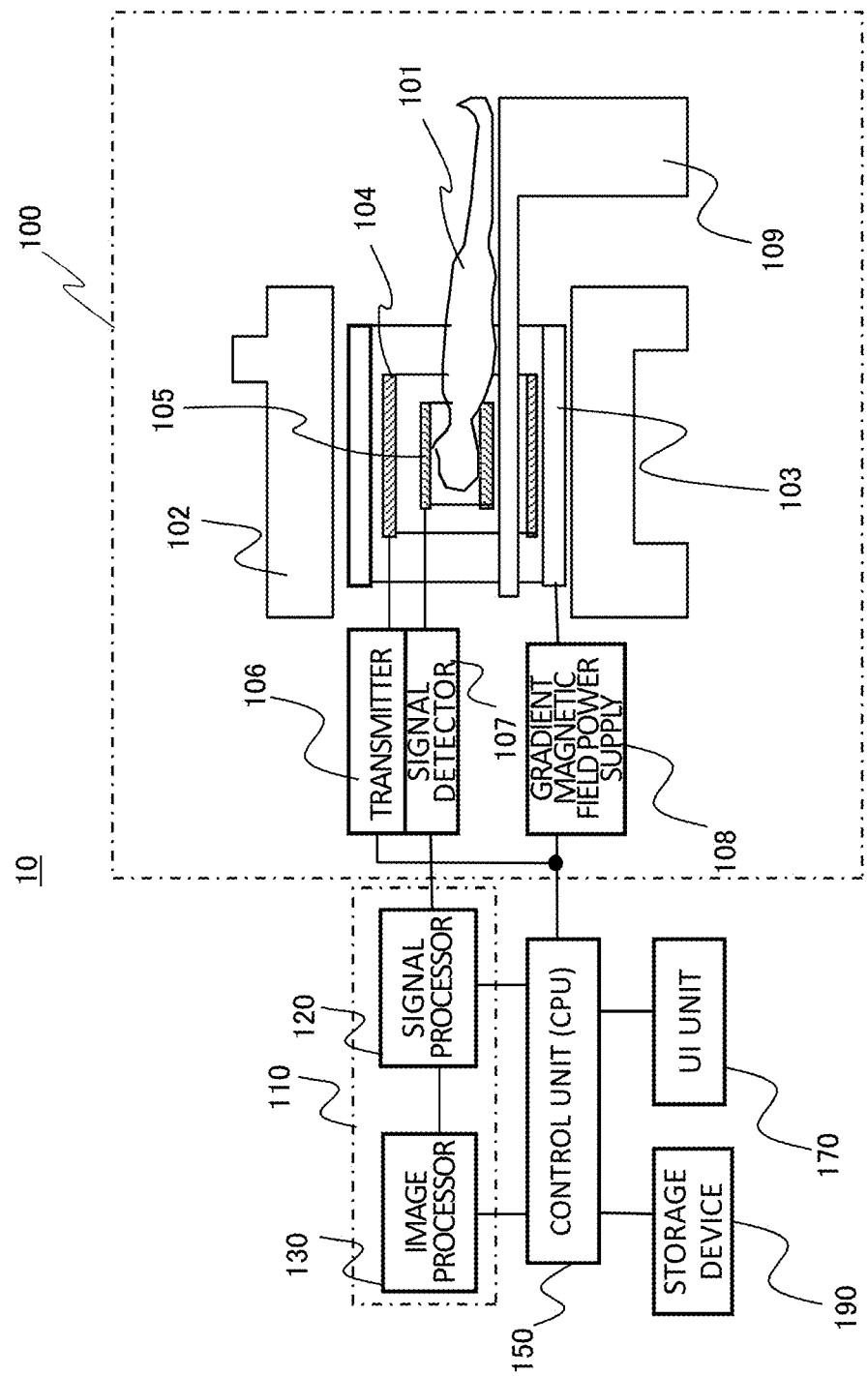
FIG. 1 is a block diagram showing the overall configuration of an MRI apparatus to which the present invention is applied.

FIG. 1 shows a configuration of a typical MRI apparatus to which the present invention is applied. The MRI apparatus 10 comprises broadly, an imaging unit 100, a processing unit 110 (a signal processor 120 and an image processor 130) configured to process an NMR signal obtained by the imaging unit, and a control unit 150, wherein the imaging unit 100 includes a magnet 102 configured to generate a homogeneous static magnetic field in imaging space where a subject 101 is placed, a gradient magnetic field coil 103 configured to generate a gradient magnetic field in the imaging space, an RF coil (transmit coil) 104 configured to generate an RF magnetic field to cause nuclear magnetic resonance (NMR) in nuclei of atoms constituting a tissue of the subject 101, and an RF probe (receive coil) 105 configured to detect the NMR signal generated from the subject 101. The subject 101 is positioned in the imaging space typically in the state lying on a table 109.

The gradient magnetic field coil 103 comprises gradient magnetic field coils in three directions of X, Y, and Z, and it generates gradient magnetic fields respectively, in response to a signal from a gradient magnetic field power supply 108. The RF coil 104 generates an RF magnetic field in response to the signal from an RF transmitter 106. The signal received by the RF probe 105 is detected by a signal detector 107, and the signal processor 120 subjects the detected signal to signal processing.

Measurement data subjected to the signal processing by the signal processor 120 is converted into an image signal by calculation, the image processor 130 performs arithmetic processing on the image being captured, and the image is displayed on the display device connected to the MRI apparatus.

Some or all of the functions of the signal processor 120, the image processor 130, and the control unit 150 can be configured by a computer or a workstation including a CPU, a GPU, and a memory, and there are also provided a UI unit 170 including an input device and a display device for interacting with a user, and a storage device 190 for storing data in the middle of calculation and an image as a calculation result.

Figure 2:
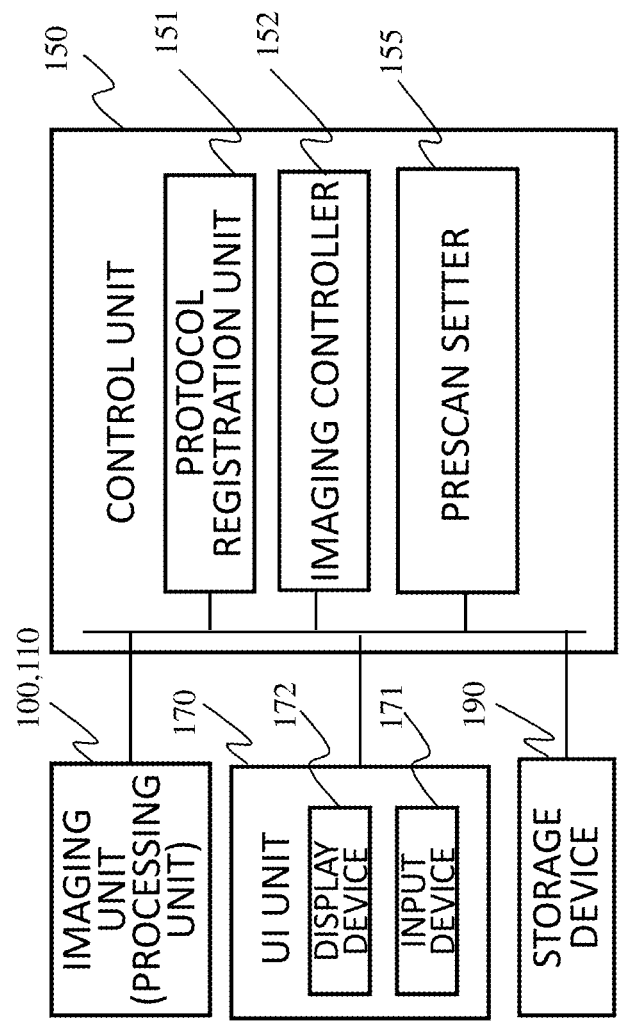
FIG. 2 is a functional block diagram of the MRI apparatus according to a first embodiment.

The control unit 150 controls the apparatus entirely, including the imaging unit 100, the processing unit 110 (the signal processor 120 and the image processor 130), the UI unit 170, and others. Control of the imaging unit 100 (the gradient magnetic field power supply 108, the RF transmitter 106, and the signal detector 107) among the control performed by the control unit 150, is performed according to a time chart of control, referred to as a pulse sequence. In the pulse sequence, there are provided basic sequences determined in advance depending on the imaging methods. An imaging method desired by the user may be selected via the UI unit 170 (FIG. 2: input device 171). Alternatively, a plurality of imaging methods may be set by selecting an examination protocol that determines in advance an order for executing a series of imaging methods in accordance with the examination site and a disease as an examination target. When the imaging method is determined and the user enters information via the input device, such as an imaging condition necessary for generating the pulse sequence, and a value of parameter generally referred to as an imaging parameter, the control unit 150 calculates the pulse sequence to be used for the imaging, from the parameter value and the basic pulse sequence determined by the imaging method, and controls the operation of the imaging unit 100 through a sequencer (not shown).

First Embodiment

The configuration of the MRI apparatus 10 according to the present embodiment is characterized in that the control unit 150 performs control on the basis of the configuration of the typical MRI apparatus described above, including the control of imaging for acquiring an image of the subject 101 (hereinafter, referred to as a main scan), and in addition, the control of a prescan performed prior to the main scan.

FIG. 2 shows an example of the functional block diagram of the control unit 150. As illustrated, the control unit 150 comprises a protocol registration unit 151 configured to register the examination protocol, an imaging controller 152 configured to control the imaging so that the imaging unit 100 performs imaging according to the registered examination protocol, and a prescan setter 155. Though not illustrated, the control unit 150 also includes functions such as a function for controlling a computation for image data, performed by the image processor 130, and a function for controlling an image displayed on the display device 172 of the UI unit 170.

The examination protocol determines the type of imaging tasks and the order thereof, and the protocol registration unit 151 accepts the examination protocol and functions as a reception unit for accepting one or more types of imaging tasks.

The prescan setter 155 is a function to control the prescan in particular, among the functions of the imaging controller 152, and automatically performs settings such as a setting whether or not the prescan is required for each imaging task, and a setting of conditions when the prescan is "Required". If necessary, the user's condition setting is accepted via the UI unit 170 (the input device 171), and the conditions of the prescan are provided semi-automatically. The imaging controller 152 controls the imaging unit 100 to execute the prescan according to the conditions set by the prescan setter 155.

The functions of the control unit 150 including the prescan setter 155 described above are stored in advance in the form of programs, in a storage device of the computer functioning as the controller 150, or in an external storage device 190. Then, the CPU reads those programs for executing the functions. Some of the functions can also be implemented by hardware such as ASIC and FPGA.

It is to be noted the functions (performance) and characteristics as a system of the MRI apparatus are determined and limited by the performance and characteristics of each element constituting the MRI apparatus described above. In the following description, the elements that determine the functions or the characteristics of the MRI apparatus are also collectively referred to as a "system".

Figure 3:
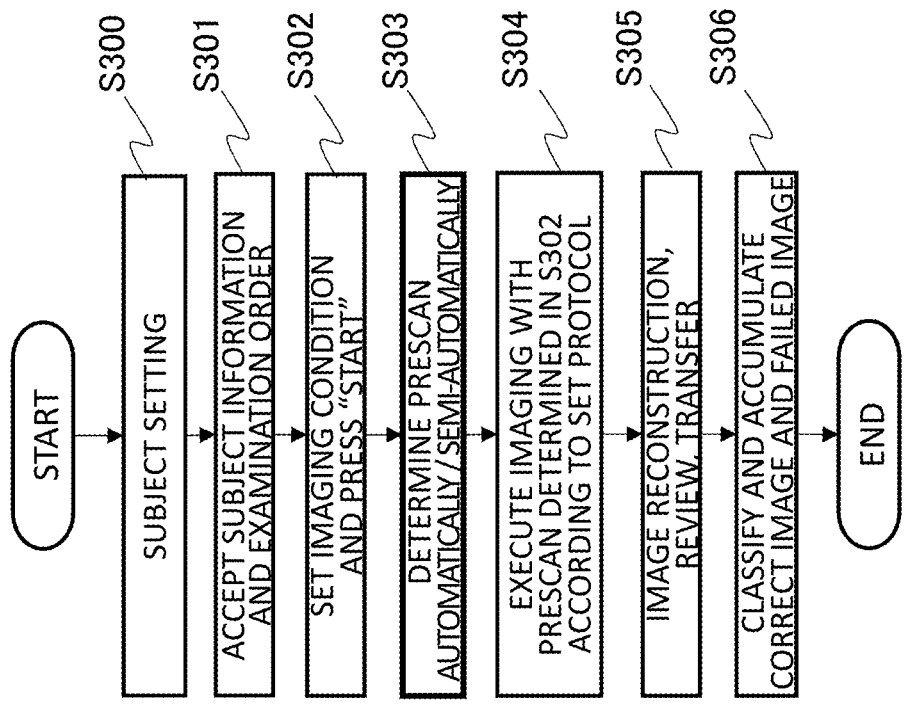
FIG. 3 is a flow diagram showing a process of imaging of the MRI apparatus according to the first embodiment.

Next, with reference to FIG. 3, there will be schematically described the imaging by the MRI apparatus according to the present embodiment.

First, the subject is set in the examination space of the MRI apparatus (S300), and the subject information and the examination order are accepted (S301). The examination order includes information regarding an examination site and a disease, and the protocol registration unit 151 selects the examination protocol corresponding to the information, and registers imaging tasks to be performed. Selection of the examination protocol may be performed automatically, or the user may set and edit the protocol via the input device 171. Then, via the input device 171, the imaging conditions (including FOV and imaging parameters) are accepted from the user, for each imaging (S302).

The imaging controller 152 generates a pulse sequence based on thus accepted imaging conditions. In order to obtain the information necessary for generating this pulse sequence, advance measurement (prescan) is performed as necessary. The pulse sequence is generated so that a favorable image can be acquired based on the information obtained by the prescan. Therefore, first, the prescan setter 155 automatically or semi-automatically determines for each imaging, whether or not the prescan is required and conditions of the prescan (S303).

The determination by the prescan setter 155 is made so that the time of the prescan is minimized, on the basis of the imaging conditions of the entire protocol. Thus, it is possible to reduce the imaging time as a whole. However, the determination is made, giving a higher priority to an image quality than the imaging time, because examination efficiency is worse when the imaging has to performed again due to an insufficient image quality. Alternatively, the user may explicitly set the priority in the determination, and in that case, the determination is made according to the priority set by the user. For the user setting, options may be presented interactively with the user via the UI unit 170.

As for the conditions of the prescan, the system automatically or semi-automatically determines an adjustment item necessary to obtain a good image quality, from an imaging site, an image type, a cross section, and others. Criterion for determining whether or not the good image quality can be obtained may be changed by the system according to machine learning. A specific method of the determination will be described in detail in the embodiment described later.

The control unit 150 displays thus provided conditions of the prescan on the display device 172, and the user may confirm or change the prescan conditions.

If the user has pressed the "START" button for starting imaging in step S302, the imaging is executed along the examination protocol, with the prescan and the pulse sequence determined in S303 (S304). That is, adjustment of the item is performed in the prescan, and imaging according to the pulse sequence is performed under the adjusted conditions.

Upon completion of the imaging, the image processor 130 generates an image, and the image is displayed on the display device 172 and stored in the storage device (S305). If necessary, the user reviews the image and transfers a desired image to the interpretation system or to a medical image management system, PACS (Picture Archiving and Communication Systems). If there is an image that failed in capturing, imaging is performed again.

Further, the transferred image and the deleted image without being transferred may be used to learn user's determinations being successful or failed in the imaging (S306). Accordingly, it is possible to accumulate conditions related to the image quality acceptable by the user, such as a degree of artifacts, resolution, and others. Then, the accumulated data can be used by the prescan setter 155 in step S303, in determining whether or not the prescan for adjusting the conditions is required, and in setting the conditions of the prescan.

Next, a more specific embodiment of the prescan control performed by the prescan setter 155 will be described.

Second Embodiment

In the present embodiment, an FOV (iFOV) being integration of FOVs of a plurality of image types is provided, and in this integrated FOV, it is determined whether the adjustment item required for each image type need to be adjusted by the prescan, in light of a standard state of the system.

Figure 4:
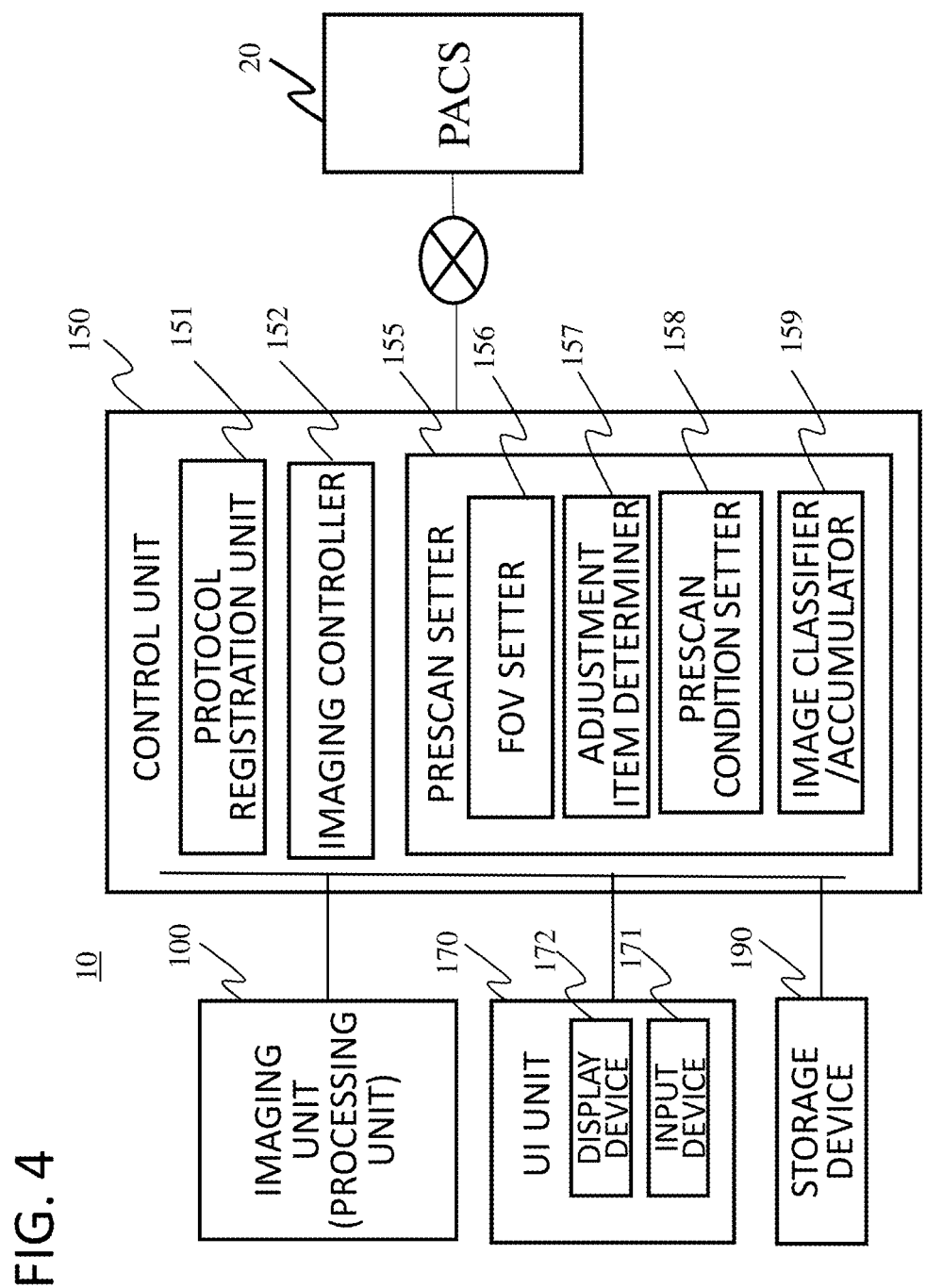
FIG. 4 is a functional block diagram according to a second embodiment of the MRI apparatus of the present invention.

The configuration of the apparatus of the present embodiment is the same as that of the first embodiment described above. However, as shown in FIG. 4, the prescan setter 155 comprises an FOV setter 156 configured to set the FOV (iFOV) including the FOVs respectively for the image types, obtained by the imaging tasks included in the examination protocol that is registered in the protocol registration unit 151, an adjustment item determiner 157 configured to determine the item to be adjusted in each imaging task, and a prescan condition setter 158 configured to set the condition of the prescan based on the adjustment item determined by the adjustment item determiner 157. The adjustment item determiner 157 refers to the standard state of the system, and determines the adjustment item that is required to be adjusted. Furthermore, if the MRI apparatus is connected to an external device such as PACS20, the prescan setter may further comprise an image classifier and accumulator 159 configured to classify and accumulate images which include images transferred to the PACS20 or to another external device and non-transferred images.

Figure 5:
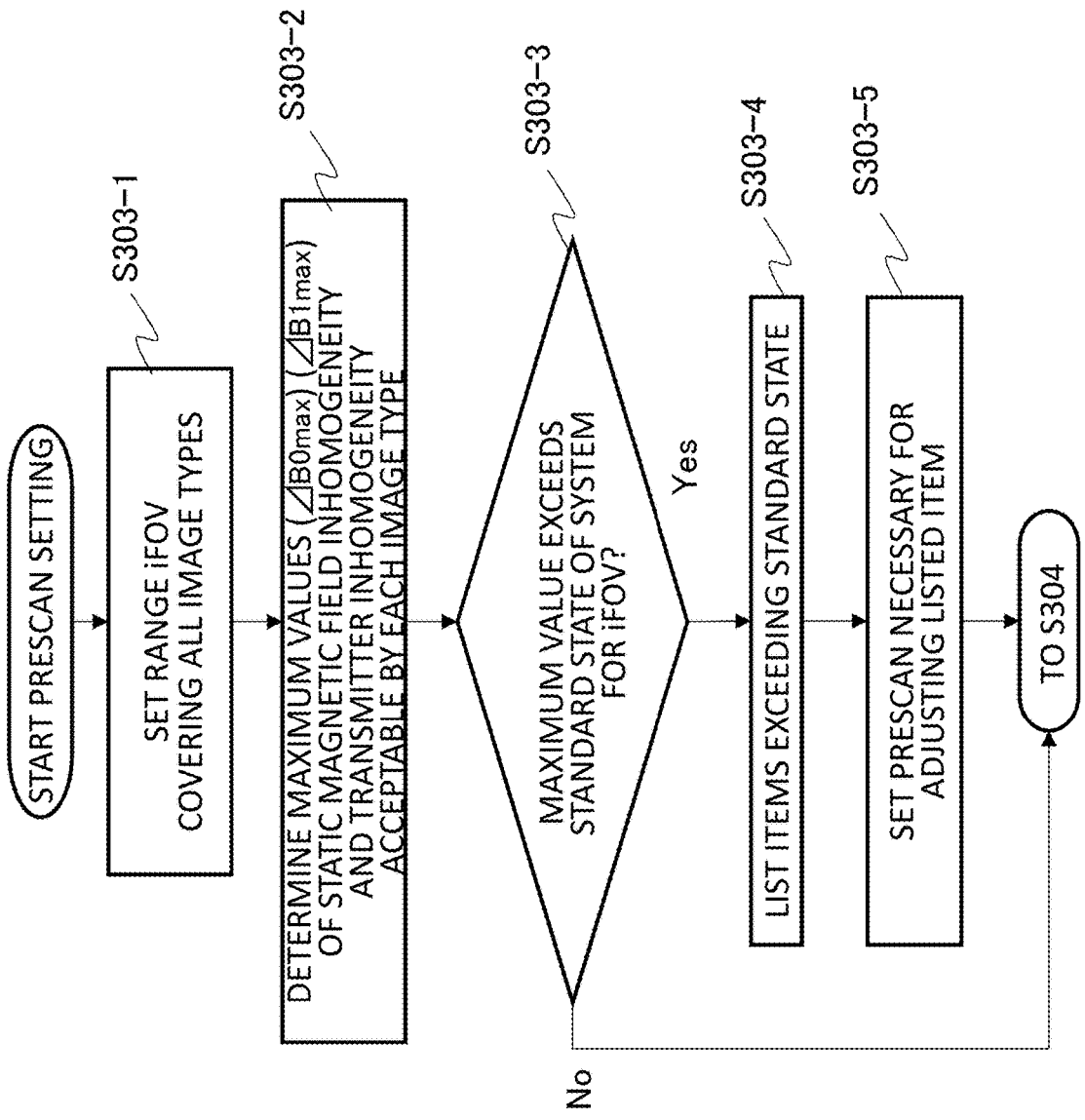
FIG. 5 is a flow diagram showing the details of step S303 of the process shown in FIG. 3.

There will be mainly described a processing of the operation of the prescan setter 155 (FIG. 3: step S303) according to the present embodiment (FIG. 5). It should be noted that the processing of the imaging is the same as in FIG. 3, and hereinafter, FIG. 3 will be referred to as appropriate.

[S301 and S302]

First, when the imaging starts, in step S301 for accepting the subject information and the examination order, the examination site information such as the head, abdomen, and knee, is determined based on the information which is entered via the input device 171. Instead of the information entered by the user, determination of the examination site information may be made according to a simpler system, such as a technique for deciding the examination site based on an image obtained in advance by the MRI apparatus and a profile image (e.g., JP-A-2019-185131 filed by the present applicant), and a technique for deciding the examination site based on information acquired by another device such as a camera (e.g., JP-A-2009-398).

According to the information inputted as the examination order, the protocol registration unit 151 selects the examination protocol in which imaging conditions of a plurality of image types are combined, from a list registered in advance. On this occasion, the examination protocol may be modified according to the subject type and a purpose of the imaging. The user may perform the selection or modification of the examination protocol via the UI unit 170 (S302), or it may be performed by the control unit 150 automatically.

FIG. 6 shows an example of the examination protocol for the abdominal examination. In this example, ten imaging tasks are included, and two out of ten correspond to the prescan for adjusting static magnetic field inhomogeneity (#2) and the prescan for adjusting transmitter B1 inhomogeneity (#3). Main imaging includes T2-weighted imaging, MRCP (Magnetic Resonance Cholangiopancreatography), T1-weighted imaging, and DWI (diffusion-weighted imaging), for example.
[S303]
At the timing when the user presses START button, the prescan setter 155 automatically or semi-automatically selects a required prescan from the examination protocol provided in step S301 described above. FIG. 5 shows the details of the present step.
[S303-1]
First, the FOV setter 156 checks imaging ranges of the image types in the main imaging included in the examination protocol, and registers, as the iFOV, a range that includes the imaging ranges of all the image types. Determining whether or not the image types included in the examination protocol correspond to the image types in the main imaging, is automatically made from the imaging conditions set in advance in step S301. It is determined according to decision criteria, such as the presence or absence of a prepulse and a type thereof, the prepulse including a fat-suppression pulse and an IR pulse, a sequence type serving as a basis, imaging parameters such as TR, TE, and FA, an imaging cross section, and imaging position.
[S303-2]
Next, the adjustment item determiner 157 extracts conditions required for the highest accuracy for each of the items (adjustment items) such as the static magnetic field inhomogeneity and the irradiation non-uniformity, from all the imaging conditions included in the examination protocol (including the imaging conditions such as the prepulse), and registers the conditions as the static magnetic field inhomogeneity ($\Delta B0max$), and irradiation non-uniformity ($\Delta B1max$), for each adjustment item.

Therefore, conditions acceptable for each of the image types, such as a degree of the static magnetic field homogeneity, a degree of irradiation uniformity, a sensitivity distribution range, and resolution, are previously registered (e.g., stored in the storage device 190). Then, among acceptable values of the image types, an acceptable value of the image type with the strictest condition is registered for each adjustment items as "$\Delta B0max$" or "$\Delta B1max$" as described above. These acceptable values may be registered as constants, or in the form of computational expressions for obtaining the values from the FOV or other imaging conditions. As the computational expression, there is provided, for example, $$\Delta B1\ max = Ar^4 + Br^3 + Cr^2 + Dr + E$$

where r=(FOV+Off-Center Amount) because the static magnetic field inhomogeneity is a quadratic function or a quartic function with respect to the distance r from the center of the magnetic field.

Further, since acceptable threshold values (e.g., thresholds of static magnetic field inhomogeneity and irradiation non-uniformity) and the degree of artifacts may differ depending on hospitals and examiners, it is possible to accumulate data from the past results and learn the accumulated data. For example, when the images acquired by the user are transferred to the PACS or to the interpretation system in step S305, images that failed in capturing are deleted and only successful images are transferred, among the remaining images excluding positioning images or prescan images. On this occasion, the image classifier and accumulator 159 accumulates the transferred images as successful images (learning images) (step S306). The adjustment item determiner 157 extracts as a feature amount of the image, the acceptable threshold, or the degree of artifacts, from the successful images accumulated in the image classifier and accumulator 159, and uses the feature amount for determining the item to be adjusted. For example, when a failure image showing poor fat suppression occurs, the values of $\Delta B1$ and $\Delta B0$ of the actual measurement of the image are compared with the transferred image, and when there is a difference relative to the correct image being transferred, the difference is reflected on the limit values acceptable in the prescan. By utilizing a result of the learning in this manner that uses the successful images, it is possible to make an adjustment appropriate for the image quality required by the user of the MRI apparatus. Learning for determining the acceptable value by using the successful images can be performed using a publicly known CNN or the like. This learning may be performed in the system of the MRI apparatus, or it may be performed in a system different from the MRI apparatus, returning a result of the learning to the MRI apparatus.
[S303-3 and S303-4]
Next, the adjustment item determiner 157 checks whether the items such as the static magnetic field inhomogeneity ($\Delta B0max$) and irradiation non-uniformity ($\Delta B1max$) of the iFOV registered in step S303-2 exceed the standard state of the system (S303-3), and makes a list of items that exceed the standard state (S303-4). Although characteristics such as the static magnetic field inhomogeneity and the irradiation non-uniformity are adjustable by the adjustment after the prescan, these characteristics are basically determined by the characteristics on the system side, such as the magnetostatic field generating magnet 102, the RF coil 104, and the RF transmitter 106 of the MRI apparatus. Then, these characteristics are kept in advance as the standard state of the system. The values to be held may reflect the values at the time of installation adjustment, or they may be internal fixed values.

In the case of the adjustment item that is dependent on the user' decision, machine learning is used to extract values of the adjustment item with which a correct image can be obtained, and the extracted values are registered. Then, such values may be used as the references.
[S303-5]
The prescan condition setter 158 sets as the prescan to be executed, the prescan on the item exceeding the reference value listed in step S303-4, and does not execute the prescan on the other adjustment items. For the prescan to be executed, the imaging conditions are provided, i.e., the iFOV is set as the imaging range, with setting the resolution. As for the resolution, the resolution required for each imaging site is held as internal values, and based on the imaging site determined by the information such as the imaging conditions entered in step S301, the internal value associated with the imaging site is employed.
[S304]
The imaging controller 152 executes the prescan determined in step S303, and subsequently, imaging of each of the image types determined in the examination protocol is sequentially executed. In the prescan, the iFOV covering all of the FOVs of the image types included in the examination protocol is used as the imaging range, and the prescan is executed to adjust the item with the strictest condition of the image type. For example, if the adjustment item is the irradiation non-uniformity, measurement of the RF distribution and adjustment of irradiation gain can be performed, using the technique as disclosed in Patent Document 2 described above.

As for the item not listed, the allowable range of all the image types meets the standard state of the system, and thus the main imaging is performed without the prescan.

According to the present embodiment, the prescan is not executed for the item for which the adjustment is not necessary, and thus this shortens the examination time. In addition, the prescan is performed with the iFOV covering the FOVs of all the image types included in the examination protocol, and thus there is no need to execute the prescan for each image type, allowing reduction of the examination time.

With reference to FIGS. 7A and 7B, there is described an effect of the present embodiment, when compared with the prior art. As shown in FIG. 7B, in the prior art, after performing as the prescan; the static magnetic field inhomogeneity adjustment (B0 shimming) and transmitter B1 inhomogeneity adjustment (S-Map setting), imaging is performed on the FOVs set for the respective imaging tasks. In the B0 shimming and the S-Map setting, there are limitations for every setting and imaging site. Therefore, if the adjusted regions do not match, the examination may be suspended due to an error, or re-imaging may be performed due to poor image quality. In contrast, in the present embodiment, as shown in FIG. 7A, the comprehensive iFOV is provided, and the settings according to the auto prescan such as the B0 shimming and the S-Map setting are performed on the iFOV. Therefore, error occurrence or the possibility of re-imaging may be reduced.

In the example shown in FIG. 5, in step S303-2, the prescan is set (the necessity of the prescan is determined) for every adjustment item. However, there may be an adjustment item with extremely short prescan time, and for such item, the determination in this step can be omitted.

Further, in the present embodiment, there has been described the case that it is automatically determined whether or not to perform the prescan, based on the decision whether or not the standard state of the system satisfies the conditions allowed for the image type. However, it is also possible to add a function to accept a designation by the user. For example, in each of the steps as described above, the use may change or input values such as the fixed value or internal values that are previously held in the apparatus. Alternatively, after setting the prescan to be executed and its conditions in step S303-5, they are displayed on the display device 172 to accept the change of the conditions.

Further, in step S301 for accepting the modification of the examination protocol and the setting of the imaging parameters, and so on, the examination protocol that lists the imaging tasks is displayed, as shown in FIG. 6. Then, the user's designation may be accepted for the imaging to obtain an image type that is critical in the examination, so that the prescan specialized for this imaging may be performed. Accepting such user's settings may result in the setting of semi-automatic prescan, but this can offer the user a higher degree of flexibility.

Third Embodiment

In the second embodiment, as the conditions of the prescan, the iFOV covering the FOVs of all the image types is set as the imaging range, and the resolution determined by the imaging site is set as the parameter. In the present embodiment, the resolution is not constant over the wide iFOV, but it varies depending on a region. There are examples of the case where the resolution varies region by region, including the case of imaging where a plurality of images is acquired along the subject axis direction with moving the table, and the case where a locally high-resolution image is obtained depending on the position to be imaged. In this kind of imaging to acquire the high-resolution image locally, fine adjustment is required also in the RF irradiation distribution and the static magnetic field distribution.

Also in the present embodiment, the functional block diagram of the control unit 150 is the same as in FIG. 4, and hereinafter, there will be described the prescan condition setting in the present embodiment, focusing on a point different from the second embodiment. FIG. 8 shows a detailed processing of step S303 according to the present embodiment. In FIG. 8, the same processing as in FIG. 5 will be shown with the same reference numerals and redundant description will not be given.

Also in the present embodiment, first, the range covering the FOVs of all the image types included in the provided examination protocol is set as the iFOV (S303-11). Then, there is provided an FOV as the imaging range for an image type to be subjected to the prescan at another resolution different from the resolution in executing the prescan with the iFOV (S303-12).

In the example shown in FIG. 8, according to the sizes of the FOV of the individual image types, the image types are grouped, and the prescan is performed with the FOV and resolution set for each group. For example, in step S303-12, it is determined whether or not the FOV of each image type is lower than a predetermined ratio ($\alpha \cdot$iFOV) of the iFOV registered in step S303-11, and a minimum value of the FOV that is lower than the predetermined ratio is registered as minFOV. As the ratio $\alpha$, a value designated by the user via the input device 171 may be accepted, or a predetermined value may be held in the system.

Next, the image types included in the examination protocol are divided into the group G1 where the FOV is less than ($\alpha \cdot$iFOV) and the group G2 where the FOV is ($\alpha \cdot$iFOV) or more, and then the image types are registered (S303-13).

For each group, as performed in step S303-2 of the second embodiment, the condition requiring the highest accuracy is extracted, from all the imaging conditions within the group (including the imaging conditions such as the prepulse), and these conditions are registered for each adjustment item, as the static magnetic field inhomogeneity ($\Delta$B0max), irradiation non-uniformity ($\Delta$B1max), and so on (S303-2).

The subsequent steps S303-3 to S303-5 are also the same as those of the second embodiment, but for each group, comparison with the system standard state is performed, items to be subjected to the prescan are listed, and the prescan conditions are set for each group. In the group G2 where FOV is ($\alpha \cdot$iFOV) or more, the imaging range of the prescan is set to be the iFOV registered in step S303-11, and the prescan is executed at the resolution predetermined by the imaging site. In group G1 where the FOV is less than ($\alpha \cdot$iFOV), the imaging region of the prescan is set to minFOV, and the prescan is executed with a resolution higher than the resolution determined by the imaging site. To achieve a higher resolution than that of G2, the resolution may be made vary corresponding to the FOV with the fixed matrix size, or the matrix size may be varied. Alternatively, the resolution of the imaging type may be set to achieve the minFOV.

In FIG. 8, the size of the FOV with respect to iFOV is used as a criterion for grouping, to make automatic decision. For example, in step S302 for accepting the modification of the examination protocol or the imaging parameter setting according to the user, designation of one or more imaging with high importance may be accepted, among the imaging types included in the examination protocol, and this one or more imaging may be set as one group to define the condition of the prescan. The present embodiment may also employ the user's entry or change of the fixed value and the change of the prescan as described in the first embodiment.

According to the present embodiment, in addition to the same effects as those of the first and second embodiments, the prescan condition is set in accordance with the resolution required for the image type to be acquired in the examination protocol, so it is possible to perform appropriate adjustment according to the prescan.

What is claimed is:

1. A magnetic resonance imaging apparatus comprising,
an imaging unit configured to acquire an nuclear magnetic resonance (NMR) signal according to a predetermined imaging sequence, the imaging unit including a magnet configured to generate a homogeneous static magnetic field in imaging space, a gradient magnetic field coil configured to generate a gradient magnetic field in the imaging space, an radio-frequency (RF) coil configured to generate an RF magnetic field, and an RF probe configured to detect the NMR signal;
a processor coupled to the imaging unit;
a memory coupled to the processor, the memory storing instructions that when executed by the processor, configure the processor to:
receive an examination protocol of imaging of an examination site of a subject, the examination protocol indicating a plurality of imaging conditions for a plurality of different images of different image types, the imaging conditions including at least a repetition time and an echo time,
determine an integrated field of view (FOV) set for the examination site of the subject, which is a range that includes imaging ranges of all of the plurality of image types of the examination protocol, at least two imaging ranges of respective two different image types having different ranges,
register in the memory a value of an imaging condition, among the plurality of imaging conditions, for each of a plurality of adjustment items subject to adjustment for imaging, the plurality of adjustment items including a static magnetic field inhomogeneity and a irradiation non-uniformity,
determine whether each of the imaging conditions of each of the adjustment items exceeds respective predetermined values for the adjustment items,
upon determining one or more imaging conditions exceed the predetermined values, execute a prescan within the range of the integrated field of view based on the one or more adjustment items having imaging conditions that exceed the respective predetermined value, and
control the imaging unit to perform the imaging of each of the image types of the examination site of the subject.

2. The magnetic resonance imaging apparatus according to claim 1,
wherein the processor is configured to divide the plurality of image types into one or more groups based on the FOVs of the image types, and set the FOV of the prescan for each of the divided groups.

3. The magnetic resonance imaging apparatus according to claim 2,
wherein the processor is configured to set, as the FOV of the prescan, the FOV of the image type having the smallest FOV among the image types belonging to the group among the group of the image types with the FOVs each having a range equal to or lower than a predetermined ratio of a comprehensive range including the FOVs of all the image types.

4. The magnetic resonance imaging apparatus according to claim 1,
wherein the processor is configured to accumulate images determined by a user as successful images out of the images acquired by the imaging unit, and determine an adjustment item, among the plurality of adjustment items, for which the prescan is performed based on imaging conditions of the successful images accumulated in the image classifier and accumulator.

5. The magnetic resonance imaging apparatus according to claim 4,
wherein the processor is configured to determine the adjustment item for which the prescan is performed by using a machine learning model that has learned the successful images as learning data.

6. The magnetic resonance imaging apparatus according to claim 4,
wherein the processor is configured to, accumulate, as the successful images, the images transferred to an external device by the user, out of the images acquired by the imaging unit.

7. The magnetic resonance imaging apparatus according to claim 1, further comprising:
a user interface coupled to the processor,
wherein the processor is configured to accept a user's instruction as to an adjustment item to be adjusted by the prescan via the user interface.

8. The magnetic resonance imaging apparatus according to claim 1,
wherein the plurality of image types include at least T2-weighted imaging, MRCP (Magnetic Resonance Cholangiopancreatography), T1-weighted imaging, and DWI (diffusion-weighted imaging).

* * * * *